(12) United States Patent
Arnault et al.

(10) Patent No.: US 9,677,616 B2
(45) Date of Patent: Jun. 13, 2017

(54) BEARING COMPRISING A WEAR RACE

(71) Applicants: Benoit Arnault, Saint-Cyr-sur-Loire (FR); Stephane Gaultier, Sonsay (FR); Thomas Perrotin, Saint Roch (FR); Philippe Walter, Fondettes (FR)

(72) Inventors: Benoit Arnault, Saint-Cyr-sur-Loire (FR); Stephane Gaultier, Sonsay (FR); Thomas Perrotin, Saint Roch (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/067,357

(22) Filed: Mar. 11, 2016

(65) Prior Publication Data

US 2016/0273586 A1    Sep. 22, 2016

(30) Foreign Application Priority Data

Mar. 16, 2015    (FR) .................... 15 52125

(51) Int. Cl.
*F16C 19/16* (2006.01)
*F16C 33/58* (2006.01)
*F16D 23/14* (2006.01)

(52) U.S. Cl.
CPC .......... *F16C 33/586* (2013.01); *F16C 19/163* (2013.01); *F16D 23/14* (2013.01); *F16D 23/143* (2013.01); *F16C 2361/43* (2013.01); *F16D 23/146* (2013.01); *F16D 2300/08* (2013.01)

(58) Field of Classification Search
CPC ...... F16C 33/586; F16C 19/163; F16D 23/14; F16D 23/143
See application file for complete search history.

(56) References Cited

U.S. PATENT DOCUMENTS

| 4,969,755 | A | * | 11/1990 | Parzefall | ................. | F16D 23/14 |
| | | | | | | 192/110 B |
| 8,286,775 | B2 | * | 10/2012 | Winkelmann | ........ | F16C 19/163 |
| | | | | | | 192/110 B |
| 2015/0308516 | A1 | * | 10/2015 | Arnault | ................... | F16D 23/14 |
| | | | | | | 192/110 B |
| 2015/0377292 | A1 | * | 12/2015 | Arnault | ................. | F16C 33/586 |
| | | | | | | 384/564 |

FOREIGN PATENT DOCUMENTS

| DE | 102004034439 A1 | 2/2006 |
| FR | 2883347 A1 | 9/2006 |
| FR | 3008149 A1 | 1/2015 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A bearing having an inner race, an outer race and a wear race mounted to press against an external face of one of the races and fastened on the race is provided. The wear race provides at least one annular flange locally covering an internal face of the race opposite the external face. The bearing further provides a sealing member fastened on the other race and includes at least one sealing lip in friction contact with the annular flange of the wear race.

10 Claims, 5 Drawing Sheets

BEARING COMPRISING A WEAR RACE

CROSS-REFERENCE TO RELATED APPLICATIONS

This application claims priority to French (FR) patent application no. 1552125 filed on Mar. 16, 2015, the contents of which are fully incorporated herein by reference.

TECHNOLOGICAL FIELD

The present invention concerns the field of bearings for a motor vehicle and in particular, for rolling bearings used in clutch release bearing devices intended to act on the diaphragm of a clutch.

BACKGROUND

Such devices comprise a rolling bearing one of the races of which turns and the other of which is fixed, the turning race being provided with a radial leading surface intended to come into contact with the end of the fingers of the diaphragm of the clutch.

A non-turning operating element supports the rolling bearing and, when acted on by a (mechanical, electrical or hydraulic) control element, moves the bearing axially so as to cause the leading surface of the turning race to press against the diaphragm of the clutch and to actuate the clutch mechanism.

With a view to limiting friction wear between the fingers of the diaphragm and the turning race during clutch engagement and release operations, it is possible to fasten onto the turning race a wear race made from synthetic material. For more details relating to such a wear race, reference may be made for example to patent application FR 2883347A1.

In the bearing described in this earlier document, a plate crimped onto the turning race is provided to ensure retention of the wear race on the race. However, this solution presents the drawback of increasing the number of components of the bearing to be manufactured, stored and assembled.

SUMMARY OF THE INVENTION

The present invention aims to remedy this drawback.

More specifically, the present invention aims to provide a bearing for a clutch release bearing device that involves a number of components that is smaller and easy to manufacture.

The present invention also aims to provide a bearing with improved sealing.

In one embodiment, the bearing comprises an inner race, an outer race and a wear race mounted so as to press against an external face of one of the races and fastened on the race. The wear race comprises at least one annular flange locally covering an internal face of the race opposite the external face. The bearing further comprises a sealing member fastened on the other race and comprising at least one sealing lip in friction contact with the annular flange of the wear race.

The annular flange of the wear race pressing against the internal face of the race promotes the securing of the wear race on the latter. Furthermore, during operation, the friction contact between the lip of the sealing member and the annular flange of the wear race ensures satisfactory sealing in this area.

The bearing may comprise at least one row of rolling elements disposed between the races.

Preferably, the bearing further comprises a seal disposed axially on the side opposite the sealing lip of the sealing member relative to the rolling elements. The seal is fastened on one of the races and comprises at least one lip interacting with the other race. Advantageously, the lip of the seal and the sealing lip of the sealing member delimit a sealed rolling space inside which the rolling elements are housed.

In one embodiment, the wear race comprises at least one stud extending via a through-opening formed in the thickness of the race, the annular flange connecting to the stud. The through-opening may be provided in an axial portion or a radial portion of the race. The wear race may comprise a plurality of studs each extending via its own through-opening which is formed in the thickness of the race, the annular flange connecting to the studs.

The opening or openings formed on the race inside which the stud or studs of the wear race penetrate promotes the production of satisfactory angular retention of the wear race on the race.

In another embodiment, the wear race comprises a centring portion provided with a surface of radial contact with the race, the annular flange connecting to the centring part.

In one embodiment, the wear race is overmoulded on the race.

In one embodiment, the sealing member comprises a self-centring sleeve mounted in the bore of the inner race and provided with the sealing lip. Alternatively, the sealing member comprises a seal fastened on the outer race and provided with the sealing lip.

The invention also concerns an assembly comprising a bearing as defined previously and an operating element supporting the bearing. The assembly may be a clutch release bearing device. The assembly may also be a motor vehicle comprising the clutch release bearing device.

BRIEF DESCRIPTION OF THE DRAWINGS

The present invention will be better understood from reading the detailed description of embodiments which are given by way of entirely non-limiting examples and are illustrated by the appended drawings, in which.

DETAILED DESCRIPTION OF THE INVENTION

Figure 1:
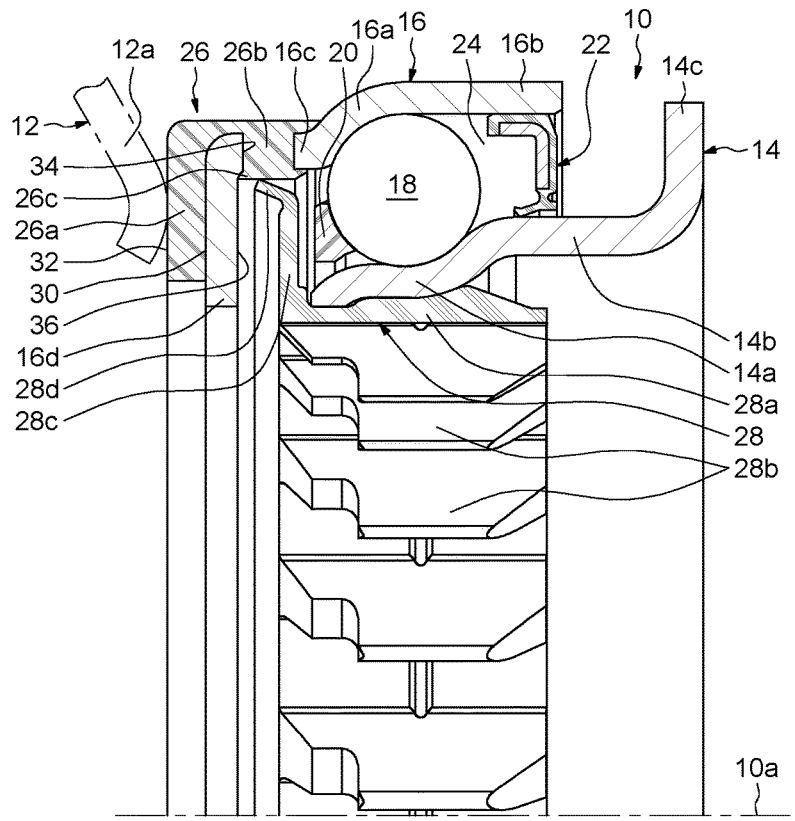
FIG. 1 is a half-view in axial section of a rolling bearing according to a first exemplary embodiment of the invention.

In FIG. 1, a rolling bearing, with the overall reference 10, is intended to be used in a clutch release bearing device provided to act on the diaphragm 12 of a clutch, in particular for a motor vehicle. In the figure, the diaphragm 12 is illustrated in part and shown in broken lines. The diaphragm 12 comprises a plurality of fingers 12a spaced in the circumferential direction. The rolling bearing 10 is designed to be mounted on an operating element (not shown) of the associated clutch release bearing device and is provided so as to be moved axially.

The rolling bearing 10, of axis 10a, comprises a non-turning inner race 14, a turning outer race 16, a row of rolling elements 18, produced, here, in the form of balls, and disposed radially between the raceways provided on the races, a cage 20 maintaining the regular circumferential spacing of the rolling elements 18, and an annular seal 22 fastened on the outer race. A rolling space 24 is delimited radially between the inner 14 and outer 16 races. Inside the rolling space 24 are housed the rolling elements 18 and the associated maintaining cage 20.

As will be described in greater detail below, the bearing 10 further comprises a wear race 26 fastened on the outer race 16 and provided in order to come axially into contact against the diaphragm 12 of the clutch. The bearing 10 further comprises a self-aligning or self-centring sleeve 28 mounted in the bore of the inner race 14.

The thin-walled inner race 14, of axis 10a, may advantageously be made by pressing a plate made, for example, from steel. The inner race 14 is made in one piece. The inner race 14 comprises a toroidal portion 14a having in cross section a quarter-circle concave internal profile that forms the track or raceway of the race for the rolling elements 18. The inner race 14 also comprises an annular axial portion 14b extending a large-diameter edge of the toroidal portion 14a axially opposite the outer race 16. The inner race 14 further comprises a radial annular collar 14c extending the axial portion 14b and that extends radially towards the exterior. The collar 14c is situated axially opposite the toroidal portion 14a with respect to the axial portion 14b.

The thin-walled outer race 16, of axis 10a, may also advantageously be made by pressing a plate made, for example, from steel. The outer race 16 is made in one piece. The outer race 16 comprises a toroidal portion 16a having in cross section a quarter-circle concave internal profile that forms the track or raceway of the race for the rolling elements 18. The toroidal portion 16a is extended at either end by annular axial portions 16b, 16c. The axial portion 16b extends a large-diameter edge of the toroidal portion 16a and radially surrounds the toroidal portion 14a of the inner race. The axial portion 16c extends a small-diameter edge of the toroidal portion 16a axially opposite the axial portion 16b. The outer race 16 also comprises an annular radial portion 16d extending radially towards the interior of the axial portion 16c.

The seal 22 is fastened on the outer race 16 and forms a dynamic seal with the inner race 14. A "dynamic seal" is understood to mean a seal between two parts in relative motion. In the exemplary embodiment illustrated, the seal 22 is fastened in the bore of the axial portion 16b of the outer race and is in frictional contact against the external surface of the axial portion 14b of the inner race. Alternatively, it may be possible to make provision for inverted mounting, namely fastening on the inner race 14 and a dynamic seal formed by interaction with the outer race 16. In the exemplary embodiment illustrated, the seal 22 comprises a frame or plate made from a rigid material and on which is disposed a sealing gasket made from a flexible material and provided with a friction lip fulfilling the function of dynamic seal. Alternatively, or in combination, the seal 22 may comprise a labyrinth-type lip in order to obtain a seal by narrow passage.

The wear race 26 is provided in order to interact by contact with the diaphragm 12. The wear race 26 is, here, produced as a single component. The wear race 26 is produced in a synthetic material. By way of indication, the wear race 26 may be produced, for example, from polyamide. Advantageously, the wear race 26 is produced from a synthetic material with an anti-friction additive filler, such as fibres of carbon and/or molybdenum bisulphide ($MoS_2$) and/or polytetrafluoroethylene (PTFE). The wear race 26 is overmoulded on the outer race 16.

The wear race 26 comprises an annular body 26a mounted so as to press against an external face 30 of the outer race 16 which is oriented towards the exterior of the bearing, i.e. on the side opposite the rolling elements 18. The body 26a in part covers the external face 30. The external face 30 is formed by the external surface of the portions 16a to 16c of the outer race and the front surface of the radial portion 16d which is oriented on the same side as the diaphragm 12. In the exemplary embodiment illustrated, the body 26a covers the radial portion 16d, the axial portion 16c and the toroidal portion 16a of the outer race on the exterior side of the bearing. The body 26a delimits a front leading or pressing surface 32 provided to interact axially by contact with the fingers 12a of the diaphragm. The diaphragm 12 comes to press against the body 26a of the wear race axially on the side opposite the outer race 16.

The wear race 26 further comprises a plurality of studs 26b extending from the body 26a and being spaced relative to one another in the circumferential direction. In the exemplary embodiment illustrated, the studs 26b are situated in one and the same radial plane and are identical to one another. In a variant, the studs may be situated in different radial planes and/or be of different shapes. Preferably, the studs 26b are spaced regularly relative to one another in the circumferential direction. In the exemplary embodiment, the wear race 26 comprises eight studs. It is possible to make provision for a different number of studs, for example two or four, and even a single stud. Each stud 26b extends via an opening 34 provided on the outer race 16 specific thereto. Each stud 26b extends radially towards the interior from the body 26a. Each stud 26b extends inside the opening 34. Each stud 26b has a shape that complements the opening 34. Each stud 26b extends in the circumferential direction over a limited angular sector.

Figure 2:
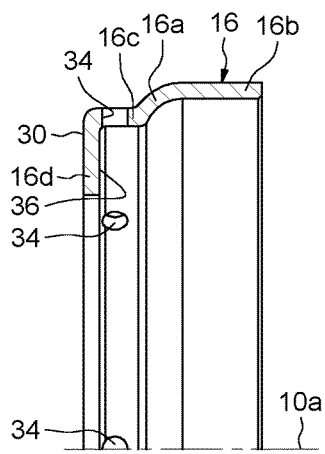
FIG. 2 is a half-view in axial section of an outer race of the bearing in FIG. 1.

As illustrated more visibly in FIG. 2, each opening 34 of the outer race is a through-opening. Each opening 34 is provided in the thickness of the outer race 16. Each opening 34 extends from the external face 30 of the outer race and opens out on an internal face 36 of the race opposite the external face. The internal face 36 of the outer race 16 is oriented towards the inside of the bearing, i.e. on the same side as the rolling elements 18 (FIG. 1). The external 30 and internal 36 faces delimit the thickness of the outer race. The internal face 36 is formed by the bore of the portions 16a to 16c of the outer race and the front surface of the radial portion 16d which is oriented on the same side as the rolling elements 18. In the exemplary embodiment illustrated, the openings 34 are provided via the axial portion 16c of the outer race. Each opening 34, here, has a cylindrical shape. Alternatively, each opening may have other shapes, for example oblong, polygonal, such as square, rectangular, etc. Each opening may also have a conical shape tapering in the direction of the rolling space 24 or away from the space.

Figure 3:
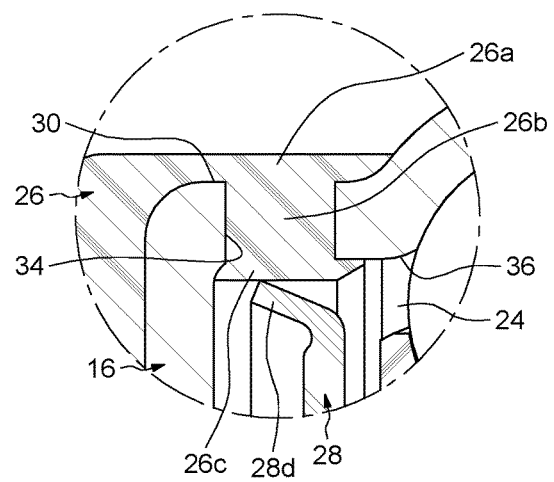
FIG. 3 is a detail view of FIG. 1, and FIGS. 4 to 7 are half-views in axial section of rolling bearings in accordance with other exemplary embodiments of the invention.

As illustrated more visibly in FIG. 3, the wear race 26 further comprises an annular flange 26c extending the plurality of studs 26b and extending in the rolling space 24 delimited between the races 14, 16. The annular flange 26c extends the free end of the studs 26b. In the exemplary embodiment illustrated, the annular flange 26c extends radially from the free end of the studs 26b and axially on either side of the studs. The annular flange 26c locally covers the internal face 36 of the outer race. The annular flange 26c and the studs 26b are formed at the time of overmoulding of the wear race 26 on the outer race 16. The annular flange 26c and the studs 26b are made from the material of the body 26a, i.e. they are produced as a single component. The annular flange 26c comes to press against the internal face 36. The annular flange 26c is mounted radially in contact against the internal face 36. The flange 26c, here, covers the internal face 36 of the axial portion 16c.

As indicated previously, in the exemplary embodiment illustrated the wear race 26 is overmoulded on the outer race 16. This results in excellent cohesion between these two pieces, in part by virtue of the openings 34 of the outer race 16 inside each of which the synthetic material penetrates to form the studs 26b of the wear race by complementarity of shape. The annular flange 26c coming to press against the internal face 36 of the outer race promotes the retention of the wear race 26 relative to the outer race. Furthermore, when the bearing 10 is operating, the annular flange 26c makes it possible to obtain a good seal in the area of the openings 34 of the outer race 16. Indeed, centrifugation tends to project the lubricant present inside the rolling space 24 towards the exterior. The annular flange 26c of the wear race makes it possible to prevent the lubricant from exiting towards the exterior of the bearing 10 via the openings 34.

With reference, again, to FIG. 1, the self-centring sleeve 28 is advantageously made from synthetic material, for example from an elastomer or from natural rubber. The sleeve 28 comprises an annular body 28a mounted in the bore of the inner race 14 in radial contact with the race, and a plurality of ribs 28b, parallel to the axis 10a, which extend substantially radially towards the interior from the bore of the body 28a and the interior free edge of which is intended to come into contact with the operating element of the clutch release bearing device. The ribs 28b are deformable radially and allow the bearing 10 to move radially relative to the operating element in the course of a clutch release operation.

The sleeve 28 further comprises an annular heel 28c extending radially towards the exterior in the direction of the outer race 16 from an axial end of the body 28a. The sleeve 28 further comprises an annular sealing lip 28d in friction contact with the annular flange 26c of the wear race. The lip 28d fulfils a dynamic seal function with the flange 26c of the wear race. The lip 28d extends from the large-diameter edge of the heel 28c. The lip 28d is oriented towards the exterior of the rolling bearing 10, i.e. on the side opposite the rolling elements 18. The lip 28d extends obliquely towards the exterior. The friction contact between the lip 28d and the annular flange 26c of the wear race is radial. The lip 28d is flexible in the radial direction. The free end of the lip 28d may advantageously have a triangular shape in cross section so as to reduce the friction torque between the lip and the wear race 26. In this exemplary embodiment, the lip 28d is disposed radially in the axial free space that exists between the inner race 14 and the axial portion 16c of the outer race.

The contact between the lip 28d of the sleeve and the annular flange 26c of the wear race makes it possible to obtain a good seal of the bearing 10 on the same side as the wear race 26. Furthermore, the friction torque between the lip 28d and the annular flange 26c is particularly limited when the wear race 26 is produced from a synthetic material with an anti-friction additive filler. The sealing lip 28d of the sleeve is disposed axially on the side opposite the seal 22 with respect to the rolling elements 18. The lip 28d of the sleeve and the seal 22 ensure sealing of the rolling space 24 containing the rolling elements 18.

Figure 4:
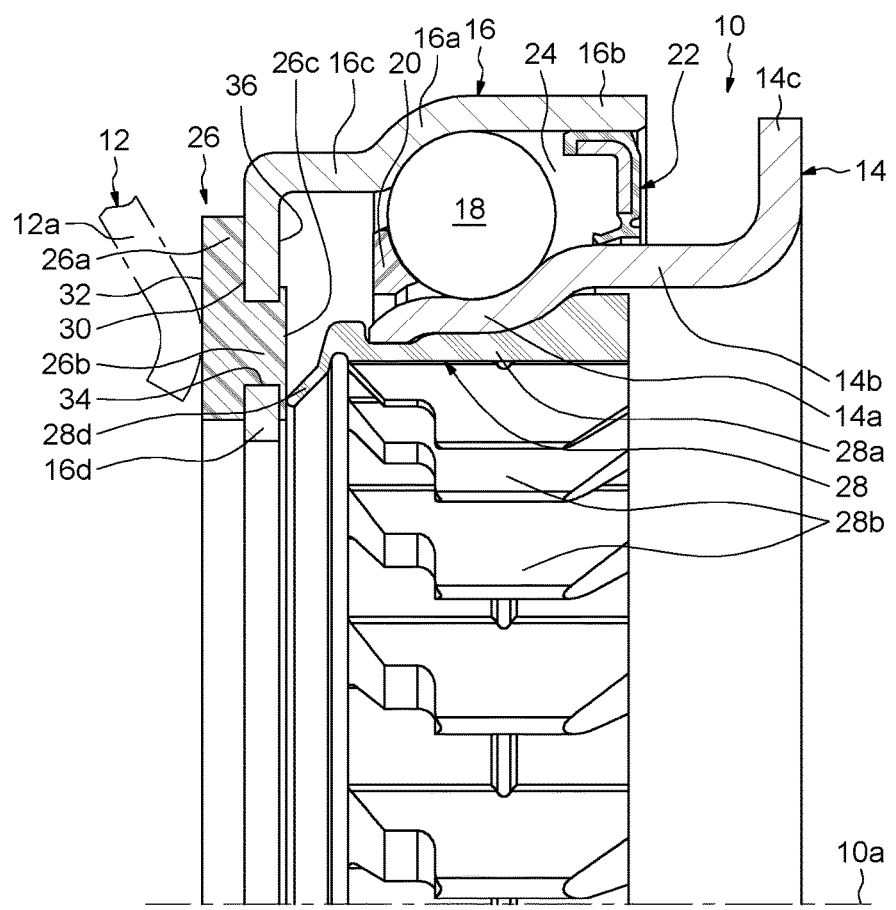

The exemplary embodiment illustrated in FIG. 4, in which identical elements bear the same references, differs from the first example described particularly in that the body 26a of the wear race has a reduced radial dimension. In this exemplary embodiment, the body 26a covers the external face 30 only in the area of the radial portion 16d of the outer race. Each stud 26b, here, extends axially towards the interior from the body 26a and inside the associated cylindrical opening 34 provided in the thickness of the radial portion 16d of the outer race. In a manner similar to the first exemplary embodiment, each through-opening 34 extends from the external face 30 of the outer race and opens out on the internal face 36 of the race.

The annular flange 26c extends the studs 26b and locally covers the internal face 36 of the outer race. The annular flange 26c extends the free end of the studs 26b. In this exemplary embodiment, the annular flange 26c extends axially from the free end of the studs 26b and radially on either side of the studs. The annular flange 26c comes to press axially against the internal face 36. The flange 26c, here, covers the internal face 36 of the radial portion 16d. In a manner similar to the first exemplary embodiment, the annular flange 26c and the studs 26b are formed at the time of overmoulding of the wear race 26 on the outer race 16. The annular flange 26c and the studs 26b are made from the material of the body 26a, i.e. they are produced as a single component.

In this exemplary embodiment, the lip 28d of the self-centring sleeve extends directly from the body 28a. The sleeve 28 is, here, devoid of a heel. The lip 28d extends obliquely here. The lip 28d is disposed axially in the axial free space that exists between the inner race 14 and the radial portion 16d of the outer race. The annular lip 28d is in friction contact with the flange 26c of the wear race. The friction contact between the lip 28d and the annular flange 26c of the wear race is axial. The lip 28d is flexible in the axial direction.

Figure 5:
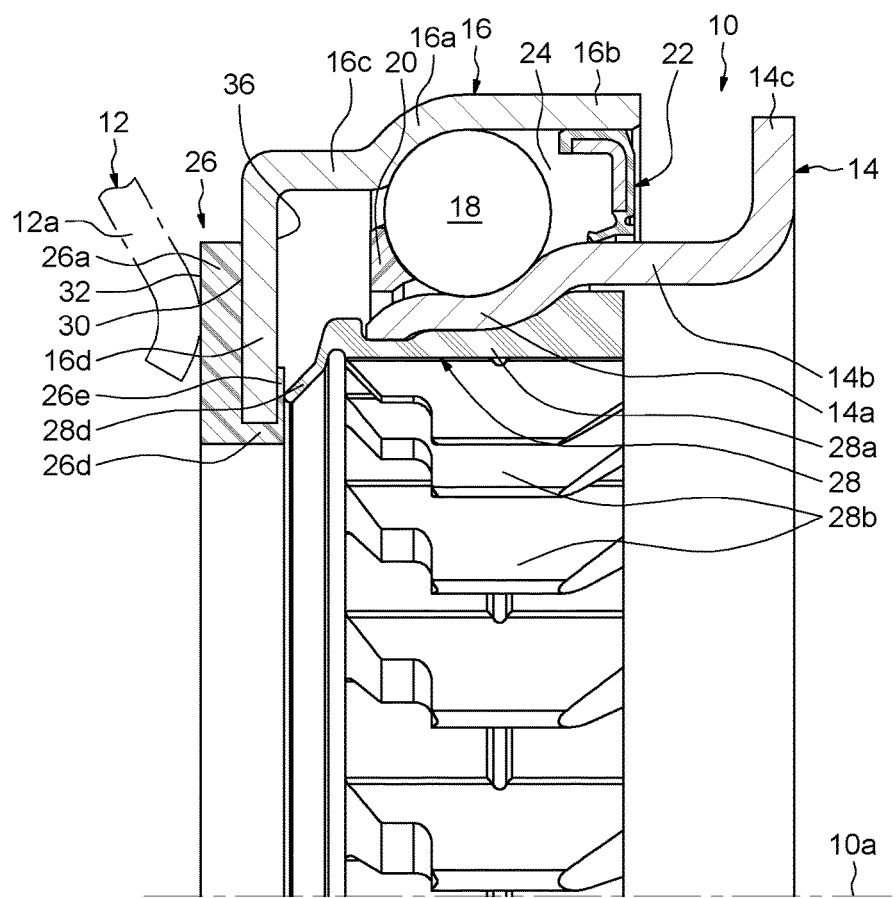

The exemplary embodiment illustrated in FIG. 5, in which identical elements bear the same references, differs from the exemplary embodiment described previously in that the wear race 26 comprises an annular internal centring portion 26d extending towards the interior of the body 26a and making it possible to ensure centring of the wear race relative to the outer race 16. The centring portion 26d of annular shape extends the body 26a axially. The centring portion 26d extends a small-diameter edge of the body 26a. The centring portion 26d comes to be centred in the bore of the outer race 16. The centring portion 26d has an external surface in radial contact with the bore. The centring portion 26d is mounted in the bore of the radial portion 16d of the outer race. In this exemplary embodiment, the wear race is devoid of the studs through the thickness of the outer race 16.

The wear race 26 also comprises an annular flange 26e extending the free end of the centring portion 26d and locally covering the internal face 36 of the outer race. The flange 26e extends radially from the centring portion 26d. The flange 26e, here, covers the internal face 36 of the radial portion 16d. The annular flange 26e comes to press axially against the internal face 36. In this exemplary embodiment, the wear race 26 is also produced as a single piece and is obtained by overmoulding on the outer race 16. The lip 28d of the self-centring sleeve is in friction contact with the annular flange 26e of the wear race. The friction contact between the lip 28d and the annular flange 26e is axial.

In the preceding exemplary embodiments, the sealing lip 28d interacting with the annular flange of the wear race 26 is formed on the sleeve. In a variant, it would be possible to provide a seal separate from the sleeve and fastened to the sleeve, the seal comprising a lip that cooperates with the outer race.

Figure 6:
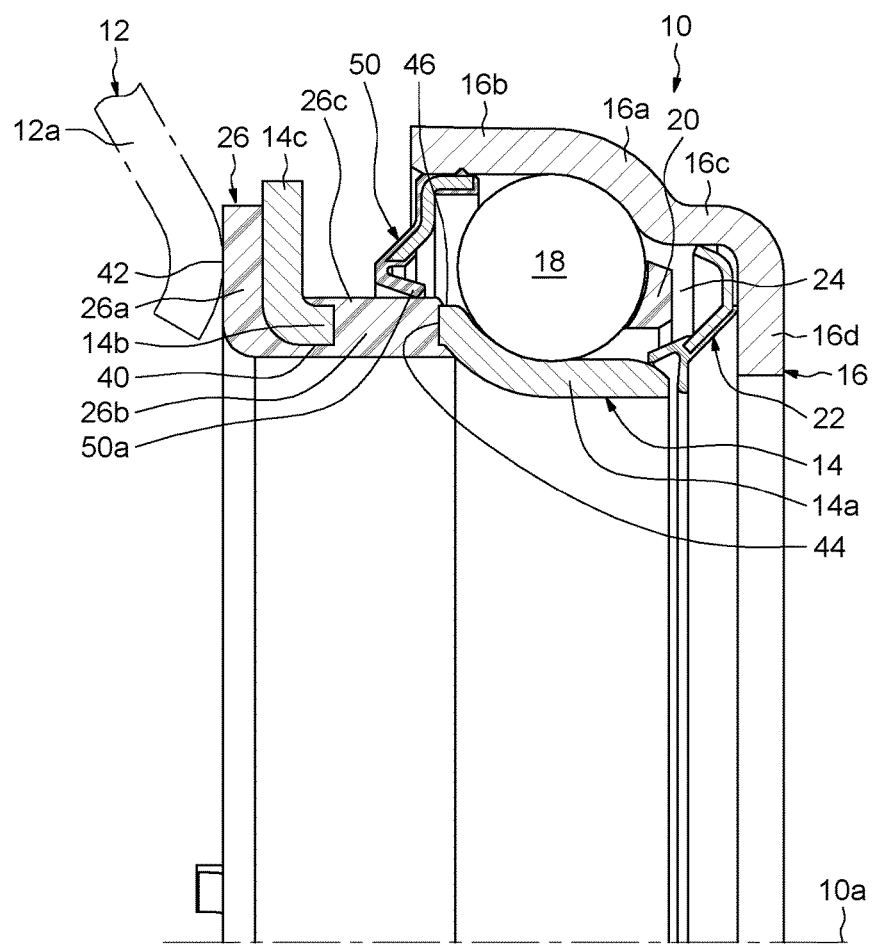

In the preceding exemplary embodiments, the wear race 26 is overmoulded on the outer race 16. In the exemplary embodiment illustrated in FIG. 6, in which identical elements bear the same references, the wear race 26 is overmoulded on the inner race 14 in so far as the inner race is provided as a turning race.

In this exemplary embodiment, the annular body 26a of the wear race 26 is mounted so as to press against an external face 40 of the outer race 14 which is oriented towards the exterior of the bearing, i.e. on the side opposite the rolling elements 18. The body 26a in part covers the external face 40. The external face 40 is formed by the bore of the portions 14a and 14b of the inner race and the front surface of the collar 14c of the race which is oriented on the same side as the diaphragm 12. In the exemplary embodiment illustrated, the body 26a covers the collar 14c and the axial portion 14b of the inner race on the exterior side of the bearing. The body 26a delimits a front leading or pressing surface 42 provided to interact axially by contact with the fingers 12a of the diaphragm. The diaphragm 12 comes to press against the body 26a of the wear race axially on the side opposite the inner race 14.

The studs 26b of the wear race extend from the body 26a and each via an opening 44 provided in the thickness of the inner race 14. Each stud 26b extends radially towards the exterior from the body 26a. Each stud 26b extends inside the associated opening 44. Each stud 26b has a shape that complements the opening 44. Each stud 26b extends in the circumferential direction over a limited angular sector.

Each opening 44 of the outer race is a through-opening. Each opening 44 extends from the external face 40 of the inner race and opens out on an internal face 46 of the race opposite the external face. The internal face 46 of the inner race 14 is oriented towards the inside of the bearing, i.e. on the same side as the rolling elements 18. The external 40 and internal 46 faces delimit the thickness of the inner race 14. The internal face 46 is formed by the external surface of the portions 14a and 14b of the inner race and the front surface of the collar 14c of the race which is oriented on the same side as the rolling elements 18. In the exemplary embodiment illustrated, the openings 44 are provided via the axial portion 14b of the inner race. Each opening 44, here, has a cylindrical shape.

The annular flange 26c of the wear race 26 extends the plurality of studs 26b. The annular flange 26c extends the free end of the studs 26b. In the exemplary embodiment illustrated, the annular flange 26c extends radially from the free end of the studs 26b and axially on either side of the studs. The annular flange 26c locally covers the internal face 46 of the inner race. The annular flange 26c comes to press against the internal face 46. The annular flange 26c is mounted radially in contact against the internal face 46. The flange 26c, here, covers the internal face 46 of the axial portion 14b of the inner race.

In this exemplary embodiment, the bearing 10 further comprises an annular seal 50 fastened on the outer race 16 and situated axially on the side opposite the seal 22 relative to the rolling elements 18. The seal 50 is fastened on the outer race 16 and forms a dynamic seal with the wear race 26. The seal 50 is, here, fastened in the bore of the axial portion 16b of the outer race.

In the exemplary embodiment illustrated, the seal 50 comprises a frame or plate (not shown) made from a rigid material and on which is disposed a sealing gasket (not shown) made from a flexible material and provided with an annular sealing lip 50a fulfilling the function of dynamic seal. The lip 50a is in friction contact with the annular flange 26c of the wear race. The lip 50a is oriented towards the interior of the rolling bearing 10, i.e. on the same side as the rolling elements 18. The lip 50a extends obliquely. The friction contact between the lip 50a and the annular flange 26c of the wear race is radial. The lip 50a is flexible in the radial direction. The lip 50a of the seal and the seal 22 ensure sealing of the rolling space 24 containing the rolling elements 18. The bearing 10 is, here, devoid of a self-centring sleeve.

In this exemplary embodiment, the seal 22 is fastened in the bore of the axial portion 16c of the outer race and comes to interact with the end of the inner race. The seal 22, here, comprises a friction lip and a labyrinth-type lip for fulfilling the function of dynamic seal.

Figure 7:
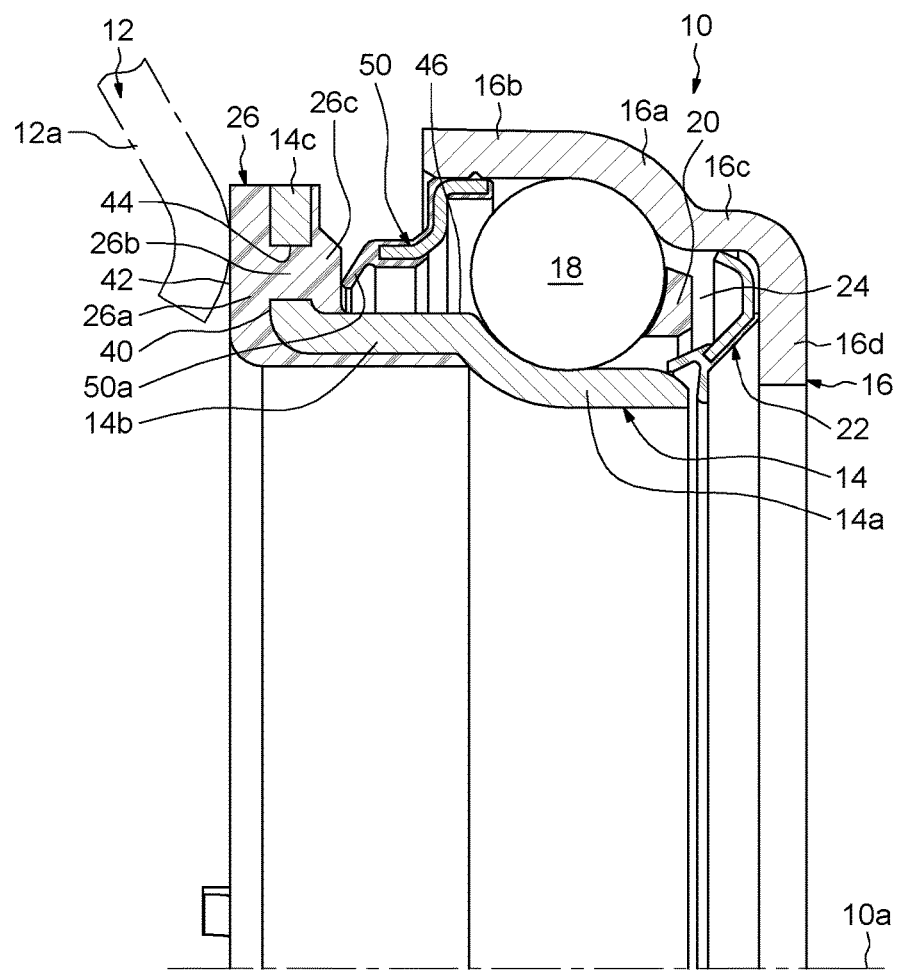

The exemplary embodiment illustrated in FIG. 7, in which identical elements bear the same references, differs from the preceding embodiment principally in that each stud 26b of the wear race extends axially towards the interior from the body 26a and inside the associated opening 44 provided in the thickness of the radial portion 14c of the inner race. In a manner similar to the preceding exemplary embodiment, each through-opening 44 extends from the external face 40 of the inner race and opens out on the internal face 46 of the race.

The annular flange 26c extends the studs 26b and locally covers the internal face 46 of the inner race. The annular flange 26c extends the free end of the studs 26b. In this exemplary embodiment, the annular flange 26c extends axially from the free end of the studs 26b and radially on either side of the studs. The annular flange 26c comes to press against the internal face 46. The annular flange 26c is mounted axially in contact against the internal face 46. The flange 26c, here, covers the internal face 46 of the radial portion 14c and locally the axial portion 14b of the inner race.

In this exemplary embodiment, the lip 50a of the seal extends towards the exterior of the bearing, i.e. on the side opposite the rolling elements 18. The lip 50a extends obliquely. The lip 50a is in friction contact with the annular flange 26c of the wear race. The friction contact between the lip 50a and the annular flange 26c of the wear race is axial. The lip 50a is flexible in the axial direction.

The invention has been illustrated on the basis of a rolling bearing in which the wear race is produced as a single piece. In a variant, the wear race could, for example, be produced as two distinct parts. The invention has been illustrated on the basis of a rolling bearing provided with a first race, a second race and at least one row of rolling elements disposed between the races. In a variant, the bearing could be a plain bearing or a swivel.

The invention claimed is:

1. A bearing comprising:
   an inner race,
   an outer race, and
   a wear race mounted to press against an external face of one of the races and fastened on the race, wherein
   the wear race provides at least one annular flange locally covering an internal face of the race opposite the external face, the bearing further providing a sealing member fastened on the other race and having at least one sealing lip in friction contact with the annular flange of the wear race.

2. The bearing according to claim 1, further comprising a seal disposed axially on the side opposite the sealing lip of the sealing member relative to rolling elements of the bearing disposed between the races, the seal being fastened on one of the races and having at least one lip interacting with the other race.

3. The bearing according to claim 2, wherein the lip of the seal and the sealing lip of the sealing member delimit a sealed rolling space inside which the rolling elements are housed.

4. The bearing according to claim 1, wherein the wear race provides at least one stud extending via a through-opening formed in the thickness of the race, the annular flange connecting to the stud.

5. The bearing according to claim 4, wherein the through-opening is provided in an axial portion or a radial portion of the race.

6. Bearing according to any one claim 1, wherein the wear race includes a centring portion provided with a surface of radial contact with the race, the annular flange connecting to the centring part.

7. The bearing according to claim 1, wherein the wear race is over moulded onto the race.

8. The bearing according to claim 1, wherein the sealing member provides a self-centring sleeve mounted in the bore of the inner race and provided with the sealing lip.

9. The bearing according to claim 1, wherein the sealing member includes a self fastened on the outer race and provided with the sealing lip.

10. An assembly comprising:

a bearing having;
- an inner race,
- an outer race, and
- a wear race mounted to press against an external face of one of the races and fastened on the race, wherein
- the wear race provides at least one annular flange locally covering an internal face of the race opposite the external face, the bearing further providing a sealing member fastened on the other race and having at least one sealing lip in friction contact with the annular flange of the wear race, and an operating element supporting the bearing.

* * * * *